United States Patent
Rainko et al.

(10) Patent No.: US 12,504,513 B2
(45) Date of Patent: Dec. 23, 2025

(54) OBJECT REFLECTIVITY ESTIMATION IN A LIDAR SYSTEM

(71) Applicant: Aptiv Technologies AG, Schaffhausen (CH)

(72) Inventors: Denis Rainko, Dublin (IE); Roman Dietz, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 131 days.

(21) Appl. No.: 18/068,192

(22) Filed: Dec. 19, 2022

(65) Prior Publication Data

US 2023/0194666 A1 Jun. 22, 2023

(30) Foreign Application Priority Data

Dec. 20, 2021 (EP) .................................. 21215901

(51) Int. Cl.
 *G01S 7/48* (2006.01)
 *G01M 11/00* (2006.01)

(52) U.S. Cl.
 CPC .......... *G01S 7/4802* (2013.01); *G01M 11/005* (2013.01)

(58) Field of Classification Search
 CPC ...... G01S 7/4802; G01S 7/4866; G01S 17/14; G01S 17/931; G01S 17/02; G01S 7/4865; G01M 11/005
 See application file for complete search history.

(56) References Cited

U.S. PATENT DOCUMENTS

| | | | |
|---|---|---|---|
| 7,639,171 B2 | 12/2009 | Alland et al. | |
| 9,140,788 B2 | 9/2015 | Kuehnle | |
| 9,470,777 B2 | 10/2016 | Arage | |
| 10,315,578 B2 | 6/2019 | Kim et al. | |
| 10,551,501 B1 | 2/2020 | Lachapelle | |

(Continued)

FOREIGN PATENT DOCUMENTS

| | | |
|---|---|---|
| CN | 112241007 | 1/2021 |
| CN | 212604823 | 2/2021 |

(Continued)

OTHER PUBLICATIONS

Manjunath, et al., "Radar Based Object Detection and Tracking for Autonomous Driving", 2018 IEEE MTT-S International Conference on Microwaves for Intelligent Mobility, Aug. 2018, 4 pages.

(Continued)

*Primary Examiner* — Jonathan M Hansen
(74) *Attorney, Agent, or Firm* — Harness, Dickey & Pierce, P.L.C.

(57) ABSTRACT

Methods, devices, systems, and computer program products for estimating object reflectivity in a light detection and ranging (LIDAR) system are disclosed. The method, for example, includes receiving LIDAR data for a plurality of LIDAR scan cycles. The method also includes generating a dataset from the LIDAR data by accumulating the recorded return signals over the plurality of scan cycles. A data feature associated with an object is identified in the dataset, and one or more parameters of the data feature are identified. An estimated reflectivity of the object may then be determined based on the one or more parameters.

19 Claims, 4 Drawing Sheets

(56) References Cited

U.S. PATENT DOCUMENTS

| | | |
|---|---|---|
| 10,649,461 B2 | 5/2020 | Han et al. |
| 10,962,628 B1 | 3/2021 | Laifenfeld et al. |
| 2016/0335923 A1 | 11/2016 | Hofmann |
| 2017/0316333 A1 | 11/2017 | Levinson et al. |
| 2018/0032822 A1 | 2/2018 | Frank et al. |
| 2018/0066957 A1 | 3/2018 | Stroila et al. |
| 2018/0188060 A1 | 7/2018 | Wheeler et al. |
| 2018/0335307 A1 | 11/2018 | Chen et al. |
| 2020/0064483 A1 | 2/2020 | Li et al. |
| 2020/0110817 A1 | 4/2020 | Viswanathan |
| 2020/0209867 A1 | 7/2020 | Valois et al. |
| 2020/0225337 A1 | 7/2020 | Kishigami |
| 2020/0284907 A1 | 9/2020 | Gupta |
| 2020/0346581 A1 | 11/2020 | Lawson et al. |
| 2021/0018592 A1 | 1/2021 | Laghezza et al. |
| 2021/0033404 A1 | 2/2021 | Lawlor et al. |
| 2021/0080544 A1* | 3/2021 | Schnitzer ............... G01S 7/484 |
| 2021/0110217 A1 | 4/2021 | Gunel |
| 2021/0157321 A1 | 5/2021 | Wang et al. |
| 2021/0390291 A1 | 12/2021 | Sameer |
| 2023/0176190 A1 | 6/2023 | Westerhoff et al. |
| 2023/0194711 A1 | 6/2023 | Rainko et al. |
| 2023/0236030 A1 | 7/2023 | Nunn et al. |
| 2024/0061091 A1* | 2/2024 | Hu ..................... G01S 7/4802 |

FOREIGN PATENT DOCUMENTS

| | | |
|---|---|---|
| CN | 112986951 | 6/2021 |
| DE | 102018203584 | 9/2019 |
| DE | 112019000049 | 1/2020 |
| EP | 3454079 | 3/2019 |
| EP | 3767333 | 1/2021 |
| EP | 3785995 | 3/2021 |
| WO | 2013056064 | 4/2013 |
| WO | 2020082363 | 4/2020 |
| WO | 2021072380 | 4/2021 |
| WO | 2021154155 | 8/2021 |

OTHER PUBLICATIONS

"Extended European Search Report", EP Application No. 23152622.9, Jun. 27, 2023, 9 pages.

"Search Report", GB Application No. 2201078.9, Jul. 11, 2022, 5 pages.

"Extended European Search Report", EP Application No. 21212231.1, May 19, 2022, 8 pages.

"Extended European Search Report", EP Application No. 21215901.6, Jun. 9, 2022, 8 pages.

"Extended European Search Report", EP Application No. 21215899.2, Sep. 23, 2022, 11 pages.

* cited by examiner

OBJECT REFLECTIVITY ESTIMATION IN A LIDAR SYSTEM

INCORPORATION BY REFERENCE

This application claims priority to European Patent Application Number EP21215901.6, filed Dec. 20, 2021, the disclosure of which is incorporated by reference in its entirety.

BACKGROUND

In recent years, sensors based upon Time-of-Flight (TOF) light detection and ranging (LIDAR) have become more widely used in automotive applications due to their ability to accurately measure objects at varying distances and obtain high angular resolution. With the increasing prevalence of autonomous driving, it is typical for such vehicles to feature one or more LIDAR devices, which may include an array of single photon avalanche diode (SPAD) devices.

In order to measure the distance to an object, the field of view is illuminated several times over a plurality of scanning cycles to accumulate enough signals in each SPAD device. These illuminations are synchronised with the recording of reflected return light back to the sensor. As such, each SPAD device functions as a TOF sensor and is used to collect information about both the three-dimensional location and the intensity of the light incident on it in every frame.

Figure 1:
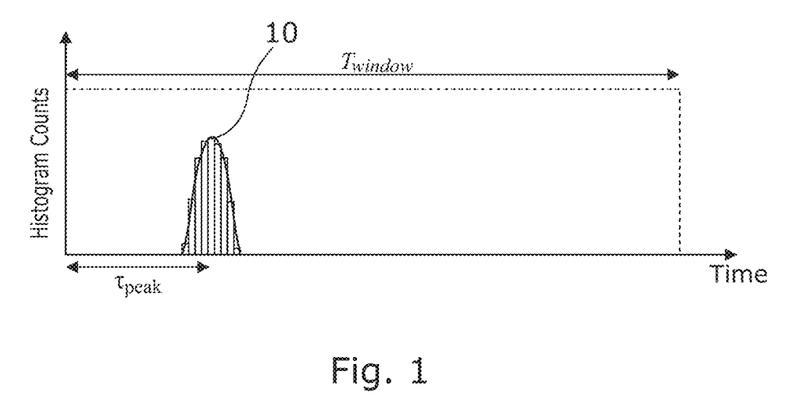
FIG. 1 shows accumulated histogram counts of a single SPAD pixel over time.

As part of this process, as illustrated in FIG. 1, a histogram is effectively created for each SPAD device which records the timing of activations within a predefined timing window ($T_{window}$) for each cycle, with the histogram counts accumulated over the plurality of cycles. Thus, the distance to an object ($R_{obj}$) can be determined by measuring the mean return time ($\tau_{peak}$) of a detected peak 10 on the histogram:

$$R_{obj}=(c \cdot \tau_{peak})/2$$

where c is the speed of light.

SUMMARY

A problem with conventional SPAD-based LIDAR systems stems from the fact that for each SPAD detector pixel, there exists a recovery time, or dead time, between two consecutive activations. Consequently, at high photon incidence rates, the detector may become saturated. As such, the responsivity of a SPAD detector is linear up to a certain incident photon rate before it levels off or, in the case of a paralyzable detector, may even decrease. Consequently, the detector can be effectively blinded at a certain level such that it is no longer able to record the actual true incident photon rate.

This is important because the recorded incident photon rate is strongly related to the reflectivity of an object being detected, which in turn is used by LIDAR systems to provide important information about the nature of that object. For example, solid structures such as walls and barriers will typically have a high reflectivity. As such, the effect of deadtime means that ambiguities and/or false scene information can be generated in situations where such objects are being detected due to the high photon rates. Equally, at shorter detection ranges, where there is also high reflected photon rates, ambiguities and false scene information can also arise.

To attempt to address the above, some LIDAR systems decrease the emitted laser power and/or reduce the detector sensitivity of the sensor. As such, if saturation begins to be observed, the system attempts to control the incident photon rate to remain within the linear region of the detector. However, this solution sacrifices the achievable range of performance and also requires additional control over the emitter power and/or sensor sensitivity on a frame-by-frame basis, which in turn increases costs. Moreover, because these mitigation techniques may only be applied to large sections of the sensor, rather than individual pixels, detection of low reflectivity objects in the same field of view is severely compromised.

Another mitigation technique utilises a larger SPAD sensor in which each pixel is made up of a number of independent SPAD elements as sub-pixels that are binned together for each measurement. In this way, the sensor may increase the probability of counting events for one SPAD element within the dead time of another SPAD element, thereby allowing the extraction of high reflectivities. However, the need for a larger sensor size increases the system complexity and, most importantly, the costs involved.

Accordingly, there remains a need to address the above shortcomings within conventional LIDAR systems.

The present disclosure relates to a method for estimating object reflectivity in a LIDAR system, and an associated processing device and computer program. The present disclosure is particularly relevant to a method for an automotive LIDAR system for use in automotive applications.

According to a first aspect, there is provided a method for estimating object reflectivity in a LIDAR system, the method including the steps of receiving LIDAR data for a plurality of LIDAR scan cycles, generating a dataset from the LIDAR data by accumulating the recorded return signals over the plurality of scan cycles, identifying a data feature associated with the object in the dataset, identifying one or more parameters of the data feature, and determining an estimated reflectivity of the object based on the one or more parameters.

In this way, an improved method of processing LIDAR data may be provided which allows for improved determination of the reflectivity of an object over a range of incident photon rates. This thereby mitigates the inherent limitation of SPAD LIDAR sensors which arise from the effects of SPAD detector deadtime. This thereby allows for improved LIDAR imaging, without increasing the cost or complexity of the LIDAR system as a whole.

In embodiments, the steps of identifying the one or more parameters of the data feature and determining an estimated reflectivity of the object includes applying a machine learning model. In this way, a trained machine learning model may be used to estimate object reflectivity. The training data may include measured incident photon rates for a plurality of objects with known reflectivities for specific LIDAR sensors. As such, reflectivity response profiles may be optimised for specific LIDAR systems.

In embodiments, the step of identifying the one or more parameters of the data feature includes fitting a distribution function to the data feature.

In embodiments, the data feature is a peak and the step of fitting the distribution function to the data feature includes identifying the rising edge of the peak and fitting the rising edge of the distribution function to the rising edge of the peak. In this way, the start of the data feature associated with a reflected object is detected in the accumulated count by its starting elevation above the noise floor. The associated binned intervals are then used to designate the starting position for fitting the distribution function. As such, the measured return signals where the sensor is least affected by deadtime are used for fitting the distribution function for improving the accuracy of the simulated values.

In embodiments, the step of fitting the distribution function to the signal includes identifying a dip in the accumulated signal counts in the dataset and adjusting the width of the distribution function based on the position of the dip in the dataset. In this way, the effect of paralysation in the SPAD detector elements, which occurs when sensor deadtime blocks noise and signal photons, is used to designate the end position for fitting the distribution function. As such, paralysation may be used to identify when the signal associated with a reflected object is no longer detectable in the integrated count, thereby improving the accuracy of fitting the distribution function.

In embodiments, the distribution function is a gaussian. In this way, a normal distribution may be used for the simulated reflectivity response, with an equal number of measurements above and below the mean value designated by the peak.

In embodiments, the step of generating the dataset includes generating a histogram.

In embodiments, the step of fitting the distribution function to the signal includes fitting a shape of the distribution function to the histogram. In this way, image processing may be used to graphically fit the shape of the measured histogram counts to the shape of the distribution function.

In embodiments, the step of determining an estimated reflectivity includes integrating counts of the fitted distribution function. In this way, the simulated accumulated counts for the fitted distribution function may be used to estimate a true accumulated signal. This thereby indicates the reflectivity of the object being detected, irrespective of the measured return signals recorded by the sensor.

In embodiments, the step of determining an estimated reflectivity includes simulating the incident beam using the fitted distribution function. In this way, the distribution function provides an estimate of the true accumulated signal that would be measured if the sensor had a linear reflectivity response.

According to a second aspect, there is provided a processing device for estimating object reflectivity in a LIDAR system, the device including an input for receiving LIDAR data for a plurality of LIDAR scan cycles, and a processor for generating a dataset from the LIDAR data by accumulating the recorded return signals over the plurality of scan cycles, for identifying a data feature associated with the object in the dataset, for identifying one or more parameters of the data feature, and for determining an estimated reflectivity of the object based on the one or more parameters. In this way, an improved LIDAR processing device may be provided that is able to compensate for inherent shortcomings in SPAD sensors by simulating reflected signals without the effect of deadtime. Furthermore, as the improved LIDAR output may be achieved though digital signal processing, rather than requiring larger or more complex sensors, a cost-effective solution may be provided.

In embodiments, the processor includes a machine learning module, and the machine learning module identifies the one or more parameters of the data feature and determines an estimated reflectivity of the object using a machine learning model.

In embodiments, the processor includes a fitting module, and the fitting module identifies the one or more parameters of the data feature by fitting a distribution function to the data feature.

In embodiments, the data feature is a peak, and the processor is configured to identify the rising edge of the peak and fit the rising edge of the distribution function to the rising edge of the peak.

In embodiments, the processor is configured to identify a dip in the accumulated signal counts in the dataset and adjust the width of the distribution function based on the position of the dip in the dataset.

According to a third aspect, there is provided a computer program product for estimating object reflectivity in a LIDAR system, the program including instructions which, when executed by a computer, cause the computer to carry out the steps of receiving LIDAR data for a plurality of LIDAR scan cycles; generating a dataset from the LIDAR data by accumulating the recorded return signals over the plurality of scan cycles; identifying a signal associated with the object in the dataset; identifying one or more parameters of the data feature; and determining an estimated reflectivity of the object based on the one or more parameters. In this way, the improved digital signal processing may be provided as software, allowing installation on pre-existing LIDAR systems by, for example, updating their controller or electronic control unit software.

In embodiments, the computer program product is stored on or realized with a non-transitory computer-readable medium, including a non-transitory computer-readable storage medium that is readable or otherwise accessible by a processor of a computer.

BRIEF DESCRIPTION OF DRAWINGS

Illustrative embodiments will now be described with reference to the accompanying drawings in which.

DETAILED DESCRIPTION

Figure 2:
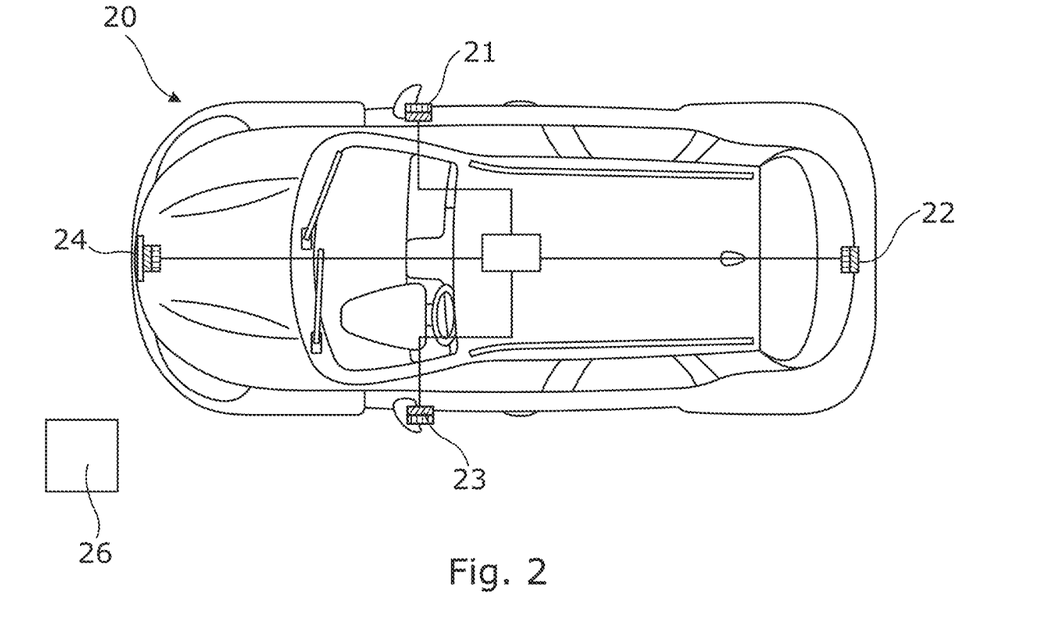
FIG. 2 shows an aerial view of an automotive LIDAR system according to an illustrative embodiment.

FIG. 2 shows an aerial view of an automotive LIDAR system 20 according to an illustrative embodiment. The LIDAR system 20 includes a plurality of LIDAR devices 21-24 mounted around the vehicle. Each LIDAR device includes a controller, an emitter and a sensor, described in detail below with reference to FIG. 3. The LIDAR devices 21-24 together provide a combined field of view surrounding the vehicle. Objects 26, such as pedestrians or structures, may enter the field of view of one or more of the LIDAR devices 21-24 to be detected by the LIDAR system 20.

Figure 3:
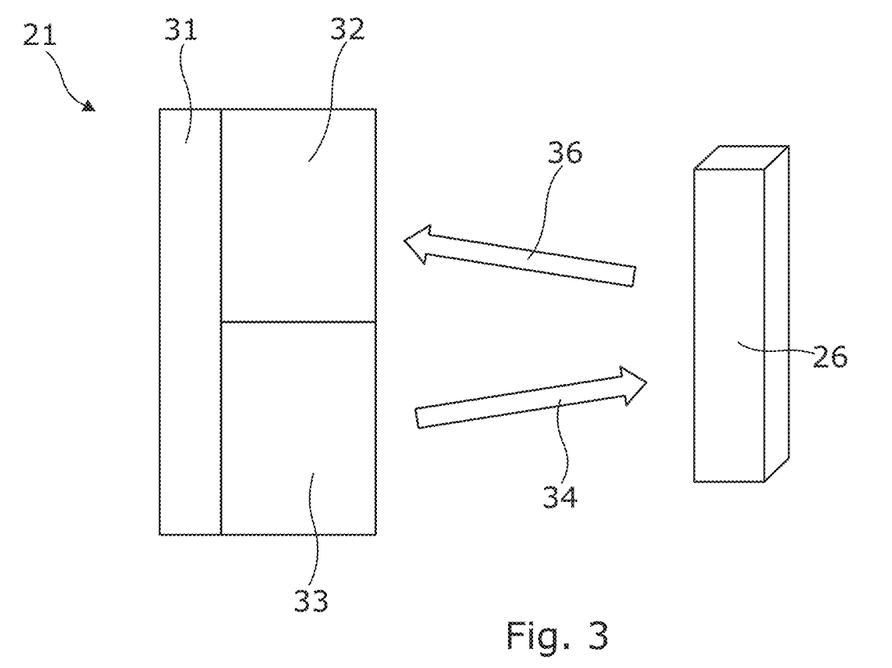
FIG. 3 shows a schematic view of a LIDAR device according to the illustrative embodiment.

FIG. 3 shows a schematic illustration of one of the LIDAR devices 21-24 shown in FIG. 2. Each LIDAR device 21-24 includes a controller 31, an emitter 33 and a sensor 32. In use, during a plurality of scan cycles, the controller 31 controls its emitter 33 to emit a series of output signals or light pulses 34 for illuminating its field of view. These signals or pulses 34 reflect off objects 26 located in the device's field of view and return reflected light 36, which is detected by the sensor 32. The photons captured by the sensor 32 during this are recorded in a dataset as an accumulated count over the series of scan cycles. As is discussed in further detail below, the higher the reflectivity of an object 26, the greater the number of photons reflected back onto the sensor 32.

In this embodiment, the controller 31 accumulates the sensor counts and performs digital signal processing to generate output data. However, in other embodiments, the controller 31 may output the recorded data to a central processor for digital signal processing. For instance, processing may be performed in an electronics control unit located elsewhere in the vehicle.

The digital signal processing method will now be described. As discussed above, the sensor 32 receives LIDAR data over the plurality of scan cycles and the dataset is generated by the controller 31 by binning the accumulated counts over the plurality of scan cycles. This thereby forms a dataset having the accumulated/integrated signal counts binned into a number of time intervals. A data feature associated with an object is then identified in the dataset, and a distribution function is fitted to the data feature to re-simulate the data lost through saturation of the LIDAR sensor 32. By recovering the undetected lost data in this way, a more accurate estimated reflectivity of the object can be calculated. This process is described in further detail below with reference to FIGS. 4A-4C and 5A-5C.

Figure 4A:
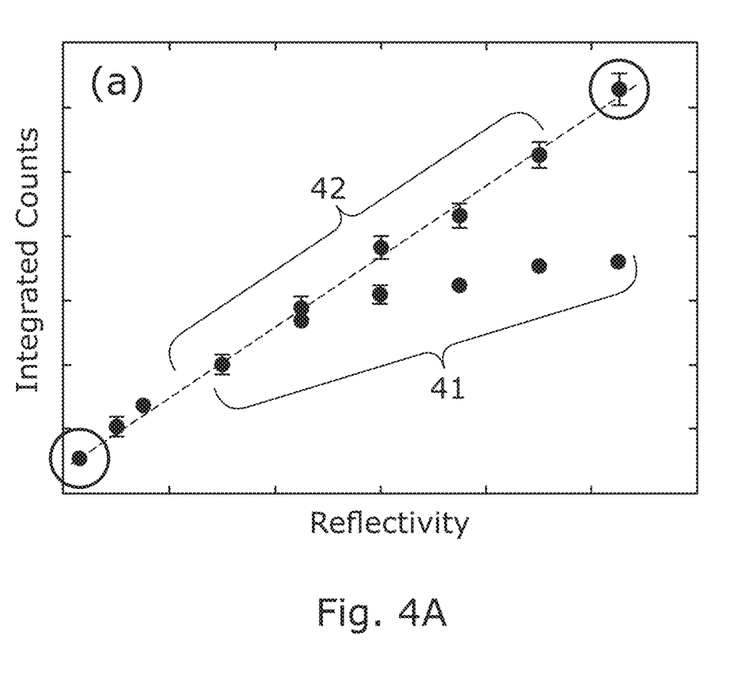
FIG. 4A shows a graph illustrating an example number of integrated peak counts of a SPAD array at different reflectivities at long range distances.

In this connection, FIG. 4A shows a graph illustrating an example relationship between object reflectivity and integrated peak counts for measured 41 and theoretical 42 distribution peaks, in this case for longer range objects. As mentioned above, as the reflectivity of an object 26 increases, the number of photons reflected back onto the sensor 32 also increases. This is illustrated by the theoretical plot 42, which shows a linear relationship between reflectivity and the integrated count value. However, in practice, because of the saturation effect of deadtime on SPAD elements within the sensor, the measured integrated count value 41 does not exhibit this linear relationship. Instead, the measured plot 41 is substantially linear at lower reflectivities, but the response is reduced as the reflectivity increases, resulting in a levelling off due to saturation.

Figure 4B:
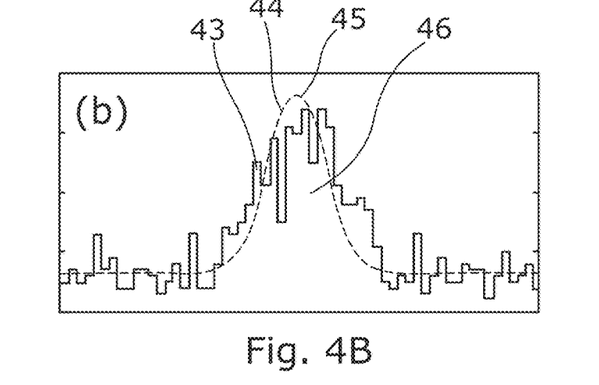
FIGS. 4B and 4C show example fitted histogram counts for the low and high reflectivities in FIG. 4A.

FIG. 4B shows an example accumulated histogram 43 count for a low reflectivity object at long range. As shown, there is a pronounced data feature in the form of a peak 46 associated with the object 26. Accordingly, if a theoretical distribution peak is fitted to this, as shown by the gaussian distribution function 44, it substantially follows the shape of the peak 46 in the measured histogram 43. As such, it can be seen in this scenario that the response of the sensor 32 is therefore linear, and so totaling the accumulated counts for the peak 46 or integrating the estimated count for the gaussian distribution function 44 can both be used to indicate the reflectivity of the object.

Figure 4C:
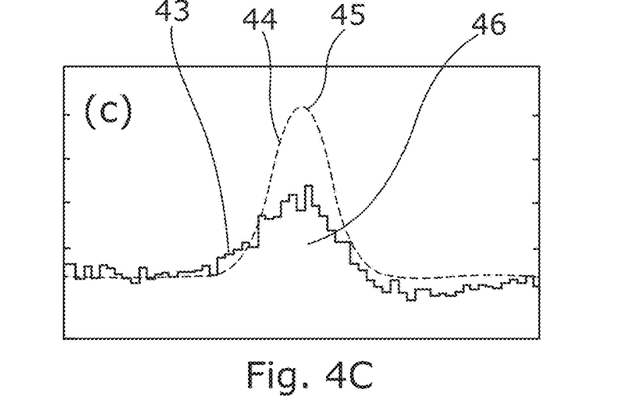

In contrast to the above, FIG. 4C shows an example accumulated histogram 43 for a high reflectivity object 26 at a similarly long range. In this case, the peak 46 associated with the object 26 is much less pronounced because the increased reflectivity has caused saturation of SPAD elements. Consequently, totaling the accumulated counts for this peak 46 would provide a less accurate indication of the object's reflectivity. However, if the gaussian distribution function 44 described above is again fitted to the peak 46 in the measured histogram count 43, the controller 31 is able to simulate linearity. In particular, the controller 31 fits the distribution function 44 by matching the rising edge of the gaussian with the rising edge of the data feature, designated by the initial slope of the measured peak 46.

The position of this rising edge in the dataset provides a parameter indicting the accumulated counts for the first reflective return signals. As such, these return signals are the least affected by saturation, and thereby provide for accurate fitting of the distribution function 44. Once fitted, the distribution function 44 simulates a linear reflectivity response and hence effectively allows the unsaturated return signals to be recovered by integrating the estimated accumulated count for the distribution function 44. That is, integration can be used to calculate the area beneath the gaussian 44 and thereby indicate the true total accumulated count for photons reflected from the object 26. This thereby indicates the reflectivity of the object in question.

Figure 5A:
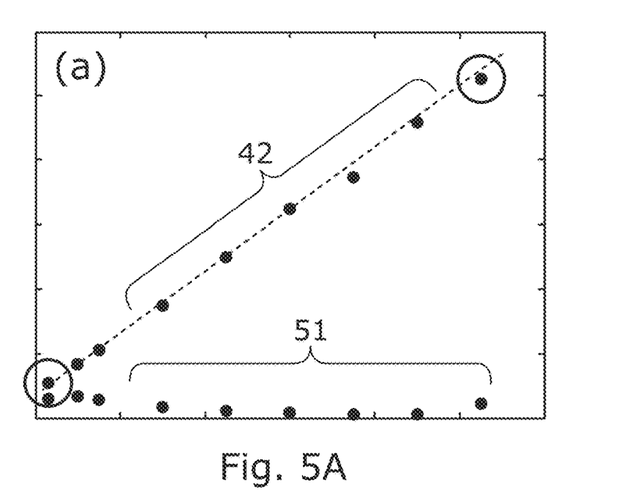
FIG. 5A shows a graph illustrating an example number of integrated peak counts of a SPAD array at different reflectivities at short range distances.

The above saturation effect is even more pronounced when objects are detected at short range. In this connection, FIG. 5A shows a graph illustrating an example relationship between object reflectivity and integrated peak counts for measured 51 and theoretical 42 distribution peaks for short range objects. As shown, the theoretical plot 42 again exhibits a linear relationship between reflectivity and the integrated count value. In contrast, the measured plot 51 falls off a lot quicker from the linear correlation, indicating that the sensor becomes saturated very quickly as reflectivity increases.

Figure 5B:
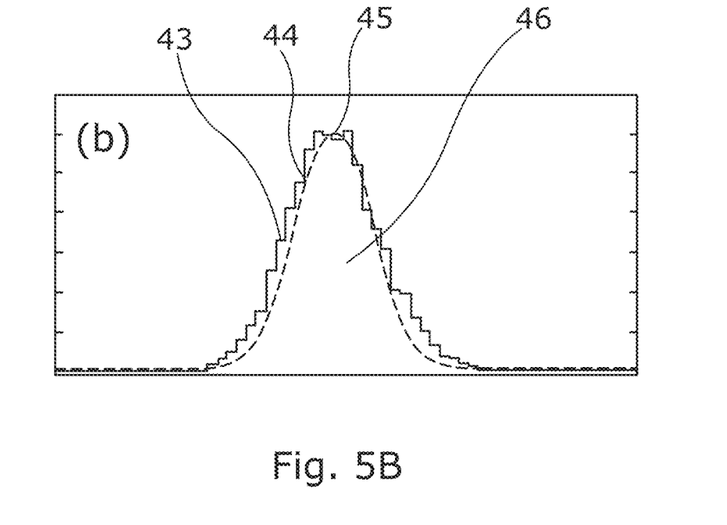
FIGS. 5B and 5C show example fitted histogram counts for the low and high reflectivities in FIG. 5A.

The above effect can also be seen in the histogram counts when viewing low and high reflectivity objects at short range. In this respect, FIG. 5B shows an example incident photon rate count histogram for a low reflectivity object viewed at short range. As shown, there is again a very pronounced peak 46 in the measured count 43 associated with the object 26, which matches the idealised gaussian distribution function 44. This contrasts with FIG. 5C, which shows an example incident photon rate count histogram for a high reflectivity object 26 viewed at short range.

Figure 5C:
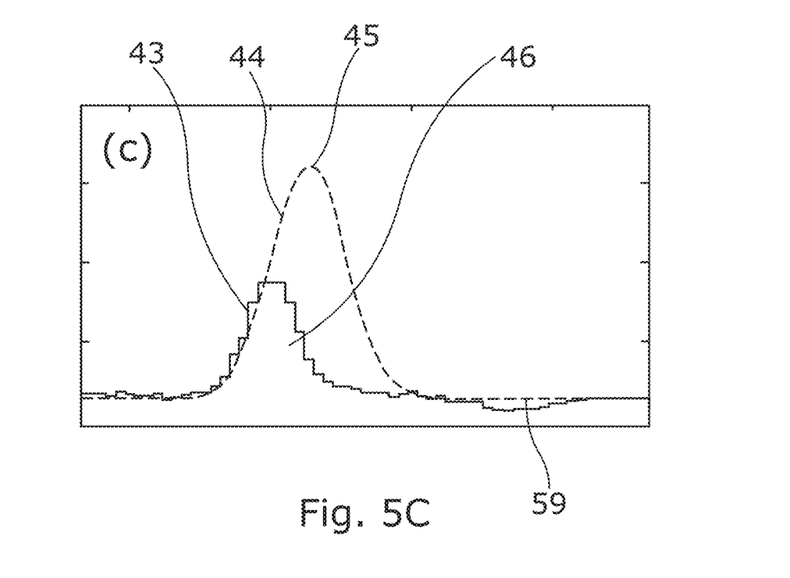

In the case of FIG. 5C, the saturation effect caused by deadtime results in a very muted peak 46 in the measured count 43. This is due to the high photon rates reflected back from the object 26. As such, as you move from left to right across the histogram, the measured count 43 quickly drops off as SPAD elements are more saturated during later time bins. Furthermore, once past the true peak photon intensity, the measured photon rate actually begins to drop, resulting in a dip 59 in the histogram. This dip 59 is caused by paralysation of the sensor elements that occurs when the high incident photon rate results in the deadtime blocking the subsequent detection of noise. As such, the position of the dip 59 in the dataset can be used as a parameter to indicate the point at which the last signal photons associated with the object 26 arrive.

In this scenario, as with the example shown in FIG. 4C, the gaussian distribution function 44 may again be fitted to the peak 46 of the measured histogram count 43 using processing within the controller 31. This matches the initial rising edge incline on the left of the gaussian peak 44 with the rising edge of the peak 46. At the same time, the dip 59 is identified by the controller 31 and used to set the width of the distribution function 44. The combination of these parameters may thereby be used to fit and size the distribution function 44 to the peak 46 in the actual measured count 43 for simulating a linear reflectivity response. As such, the unsaturated accumulated return signal count can again be recovered by integrating counts for the distribution function 44. As in the above example, this allows the reflectivity of the object 26 in question to be determined, despite much of the incident photon rate data being unrecorded.

With the above, an improved LIDAR method, processing device, and computer program for estimating reflectivity over a range of photo incident rates can be provided. Advantageously this bypasses the inherent limitations of the saturation effect of the sensor, and it may provide improved reflectivity determination and image output resolution, without increasing the cost or complexity of the LIDAR system.

It will be understood that the embodiments illustrated above show applications only for the purposes of illustration. In practice, embodiments may be applied to many different configurations, the detailed embodiments being straightforward for those skilled in the art to implement.

In this connection, for example, although the examples above describe the technique in the context of fitting the distribution function to a signal peak in a histogram, it will be understood that the data processing may not require a histogram to be generated. For example, in some embodiments, a controller implementing a machine learning model may be used to identify a data feature associated with an object from the dataset and estimate the reflectivity based on one or more parameters of this data feature. The machine learning model may be trained, for example, using an algorithm and training data including measured incident photon rates for a plurality of objects with known reflectivities.

EXAMPLE IMPLEMENTATIONS

Example 1: A method for estimating object reflectivity in a LIDAR system, the method comprising the steps of: receiving LIDAR data for a plurality of LIDAR scan cycles; generating a dataset from the LIDAR data by accumulating the recorded return signals over the plurality of scan cycles; identifying a data feature associated with the object in the dataset; identifying one or more parameters of the data feature; and determining an estimated reflectivity of the object based on the one or more parameters.

Example 2: A method according to claim 1, wherein the steps of identifying the one or more parameters of the data feature and determining an estimated reflectivity of the object comprises applying a machine learning model.

Example 3: A method according to claim 1, wherein the step of identifying the one or more parameters of the data feature comprises fitting a distribution function to the data feature.

Example 4: A method according to claim 3, wherein the data feature is a peak, and the step of fitting the distribution function to the data feature comprises identifying the rising edge of the peak and fitting the rising edge of the distribution function to the rising edge of the peak.

Example 5: A method according to claim 1 or 2, wherein the step of fitting the distribution function to the signal comprises identifying a dip in the accumulated signal counts in the dataset and adjusting the width of the distribution function based on the position of the dip in the dataset.

Example 6: A method according to any of claims 3 to 5, wherein the distribution function is a gaussian.

Example 7: A method according to any of claims 3 to 6, wherein the step of generating the dataset comprises generating a histogram.

Example 8: A method according to claim 7, wherein the step of fitting the distribution function to the signal comprises fitting a shape of the distribution function to the histogram.

Example 9: A method according to any of claims 3 to 8, wherein the step of determining an estimated reflectivity comprises integrating counts of the fitted distribution function.

Example 10: A processing device for estimating object reflectivity in a LIDAR system, the device comprising: an input for receiving LIDAR data for a plurality of LIDAR scan cycles; and a processor for generating a dataset from the LIDAR data by accumulating the recorded return signals over the plurality of scan cycles, for identifying a data feature associated with the object in the dataset, for identifying one or more parameters of the data feature, and for determining an estimated reflectivity of the object based on the one or more parameters.

Example 11: A processing device according to claim 10, wherein the processor comprises a machine learning module, and the machine learning module identifies the one or more parameters of the data feature and determines an estimated reflectivity of the object using a machine learning model.

Example 12: A processing device according to claim 10, wherein the processor comprises a fitting module, and the fitting module identifies the one or more parameters of the data feature by fitting a distribution function to the data feature.

Example 13: A processing device according to claim 12, wherein the data feature is a peak, and the processor is configured to identify the rising edge of the peak and fit the rising edge of the distribution function to the rising edge of the peak.

Example 14: A processing device according to claim 12 or 13, wherein the processor is configured to identify a dip in the accumulated signal counts in the dataset and adjust the width of the distribution function based on the position of the dip in the dataset.

Example 15: A computer program product for estimating object reflectivity in a LIDAR system, the program comprising instructions which, when executed by a computer, cause the computer to carry out the steps of: receiving LIDAR data for a plurality of LIDAR scan cycles; generating a dataset from the LIDAR data by accumulating the recorded return signals over the plurality of scan cycles; identifying a data feature associated with the object in the dataset; identifying one or more parameters of the data feature; and determining an estimated reflectivity of the object based on the one or more parameters.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

What is claimed is:

1. A method for estimating object reflectivity in a light detection and ranging (LIDAR) system, the method comprising:
   receiving LIDAR data for a plurality of scan cycles, the LIDAR data including recorded return signals;
   generating a dataset from the LIDAR data by accumulating the recorded return signals over the plurality of scan cycles;
   identifying in the dataset a data feature associated with an object;
   identifying one or more parameters of the data feature and fitting a distribution function to the data feature, wherein the fitting of the distribution function to the data feature re-simulates and recovers data lost through saturation of one or more LIDAR sensors of the LIDAR system;
   integrating counts of the fitted distribution function to provide an integrated count value; and
   determining an estimated reflectivity of the object based on the one or more parameters and the integrated count value.

2. The method according to claim 1, wherein the identifying the one or more parameters of the data feature and the determining the estimated reflectivity of the object comprise applying a machine learning model.

3. The method according to claim 1, wherein:
   the data feature comprises a peak; and
   the fitting of the distribution function to the data feature comprises:
      identifying a rising edge of the peak, and
      fitting a rising edge of the distribution function to the rising edge of the peak.

4. The method according to claim 1, wherein the fitting of the distribution function to the data feature comprises:
   identifying a dip in accumulated signal counts of the dataset; and
   adjusting a width of the distribution function based on a position of the dip in the dataset.

5. The method according to claim 1, wherein the distribution function is a gaussian.

6. The method according to claim 1, wherein the generating the dataset comprises generating a histogram.

7. The method according to claim 6, wherein the fitting of the distribution function to the data feature comprises fitting a shape of the distribution function to the histogram.

8. A processing device for estimating object reflectivity in a light detection and ranging (LIDAR) system, the processing device comprising:
   an input configured to receive LIDAR data for a plurality of scan cycles, the LIDAR data including recorded return signals; and
   a processor configured to
      generate a dataset from the LIDAR data by accumulating the recorded return signals over the plurality of scan cycles,
      identify in the dataset a data feature associated with an object,
      identify one or more parameters of the data feature, and
      determine an estimated reflectivity of the object based on the one or more parameters,
   wherein
      the processor comprises a fitting module,
      the fitting module is configured to identify the one or more parameters of the data feature by fitting a distribution function to the data feature,
      the fitting of the distribution function to the data feature re-simulates and recovers data lost through saturation of one or more LIDAR sensors of the LIDAR system, and
      the processor is configured to determine the estimated reflectivity by integrating counts of the fitted distribution function.

9. The processing device according to claim 8, wherein:
   the processor comprises a machine learning module; and
   the machine learning module is configured to:
      identify the one or more parameters of the data feature, and
      determine the estimated reflectivity of the object using a machine learning model.

10. The processing device according to claim 8, wherein:
    the data feature comprises a peak; and
    the processor is configured to
       identify a rising edge of the peak, and
       fit a rising edge of the distribution function to the rising edge of the peak.

11. The processing device according to claim 8, wherein the processor is configured to:
    identify a dip in accumulated signal counts of the dataset; and
    adjust a width of the distribution function based on a position of the dip in the dataset.

12. The processing device according to claim 8, wherein the distribution function is a gaussian.

13. The processing device according to claim 8, wherein the processor is configured to generate the dataset by generating a histogram.

14. A non-transitory computer-readable medium for estimating object reflectivity in a light detection and ranging (LIDAR) system, the non-transitory computer-readable medium comprising instructions stored therein that, when executed by a computer, cause the computer to:
    receive LIDAR data for a plurality of scan cycles, the LIDAR data including recorded return signals;
    generate a dataset from the LIDAR data by accumulating the recorded return signals over the plurality of scan cycles;
    identify in the dataset a data feature associated with an object;
    identify one or more parameters of the data feature by fitting a distribution function to the data feature, wherein the fitting of the distribution function to the data feature re-simulates and recovers data lost through saturation of one or more LIDAR sensors of the LIDAR system; and
    determine an estimated reflectivity of the object based on the one or more parameters by integrating counts of the fitted distribution function.

15. The non-transitory computer-readable medium according to claim 14, wherein the instructions, when executed by a computer, cause the computer to identify the one or more parameters of the data feature and the determine the estimated reflectivity of the object by applying a machine learning model.

16. The method of claim 1, wherein the estimated reflectivity of the object refers to a rate of photons reflected off the object.

17. The method of claim 1, wherein:
    the distribution function simulates a linear reflectivity response of the object; and
    integrating the counts of the fitted distributed function is performed to recover unsaturated return signals.

18. The method of claim 1, wherein:
the fitted distribution function is a Gaussian distribution function;
the integrating of the counts is performed to calculate an area beneath the Gaussian distribution function to obtain a true total accumulated count for photons reflected from the object, wherein the integrated count value is the true total accumulated count; and
the true total accumulated count indicating the reflectivity of the object.

19. The method of claim 18, wherein the true total accumulated count for the Gaussian distribution function is greater than an accumulated histogram count of the dataset.

\* \* \* \* \*